United States Patent
Nurminen et al.

(10) Patent No.: US 8,812,232 B2
(45) Date of Patent: Aug. 19, 2014

(54) METHOD AND APPARATUS FOR REDUCING ENERGY CONSUMPTION OF A USER EQUIPMENT

(75) Inventors: Jukka Kalevi Nurminen, Espoo (FI); Petri Otto Kalevi Niska, Helsinki (FI)

(73) Assignee: Nokia Corporation, Espoo (FI)

(*) Notice: Subject to any disclaimer, the term of this patent is extended or adjusted under 35 U.S.C. 154(b) by 916 days.

(21) Appl. No.: 12/489,389

(22) Filed: Jun. 22, 2009

(65) Prior Publication Data

US 2010/0324819 A1    Dec. 23, 2010

(51) Int. Cl.
*G01C 21/20* (2006.01)

(52) U.S. Cl.
USPC ....................................................... 701/490

(58) Field of Classification Search
CPC .......................... G01C 21/20; B60W 2550/402
USPC ......... 701/408, 412, 445, 468, 469, 472, 473, 701/476, 491, 494, 495, 502, 505, 490; 455/275, 276, 123, 121, 118; 475/275, 475/276, 123, 121, 118
See application file for complete search history.

(56) References Cited

U.S. PATENT DOCUMENTS

| | | | |
|---|---|---|---|
| 5,559,511 A * | 9/1996 | Ito et al. ................... | 340/995.21 |
| 6,970,783 B2 * | 11/2005 | Knockeart et al. ............ | 701/469 |
| 7,853,273 B2 * | 12/2010 | Beyer, Jr. ...................... | 455/457 |
| 2007/0021913 A1 * | 1/2007 | Heiniger et al. .............. | 701/213 |
| 2007/0146129 A1 * | 6/2007 | Sun .......................... | 340/539.13 |
| 2008/0002190 A1 | 1/2008 | Romain et al. | |
| 2008/0082254 A1 | 4/2008 | Huhtala et al. | |
| 2008/0262721 A1 | 10/2008 | Guo et al. | |
| 2009/0093957 A1 * | 4/2009 | Se et al. ........................ | 701/213 |

FOREIGN PATENT DOCUMENTS

| | | |
|---|---|---|
| EP | 1859294 A2 | 11/2007 |
| JP | 2005/309513 A | 11/2005 |
| WO | 1949032 A2 | 7/2008 |

OTHER PUBLICATIONS

Hwang, S., Kim, C., Lee, E., An, S., Kim, D.: Network Supporting Middleware for New Networks with Geographical Location Information (Abstract). International Conference on Information Networking 2008, Korea University, Seoul, Korea, (2008).

Nicholson, A., Noble, B.: BreadCrumbs: Forecasting Mobile Connectivity (Abstract). International Conference on Mobile Computing and Networking 2008, San Francisco, CA, USA, http://doi.acm.org/10.1145/1409944.1409952.

Wang, X., Ma, J., Wang, S., Bi, D.: Time Series Forecasting for Energy-efficient Organization Wireless Sensor Networks. State Key Laboratory of Precision Measurement Technology and Instruments, Department of Precision Instruments, Tsinghua University, Sensors, vol. 7, pp. 1766-1792 (2007).

* cited by examiner

*Primary Examiner* — John Q Nguyen
*Assistant Examiner* — Jordan S Fei
(74) *Attorney, Agent, or Firm* — Ditthavong & Steiner, P.C.

(57) ABSTRACT

An approach is provided for energy-efficient location tracking. An energy saving module obtains measured location data of the user equipment, and determines a function to forecast locations of the user equipment based on the measured location data to output forecast location data. The energy saving module further receives movement data from a sensor of the user equipment, and converts the movement data to converted location data. The energy saving module then compares the forecast location data with the converted location data for a deviation, and then it either initiates reporting of the deviation when the deviation exceeds a predetermined range, or disables the reporting of the deviation when the deviation is within the predetermined range.

20 Claims, 9 Drawing Sheets

FIG. 9

METHOD AND APPARATUS FOR REDUCING ENERGY CONSUMPTION OF A USER EQUIPMENT

BACKGROUND

Wireless (e.g., cellular) service providers and device manufacturers are continually challenged to deliver value and convenience to consumers by, for example, providing compelling network services, applications, and content. However, as the number of available services increases, the energy consumption of the user equipment increases and forces the user to recharge the user terminal more frequently. Such inconvenience (i.e., reduced battery life) is a significant factor in a consumer' decision to purchase and use a particular user equipment. As a consequence, the service providers and device manufacturers face the additional challenges of reducing energy consumption of a user equipment while providing multiple services.

SOME EXAMPLE EMBODIMENTS

Therefore, there is a need for an approach for reducing energy consumption of a user equipment.

According to one embodiment, a method comprises obtaining measured location data of a user equipment and determining a function to forecast locations of the user equipment based on the measured location data to output forecast location data. The method also comprises for receiving movement data from a sensor of the user equipment, and converting the movement data to converted location data. The method further comprises comparing the forecast location data with the converted location data for a deviation. The method further comprises initiating reporting of the deviation when the deviation exceeds a predetermined range, and disabling the reporting of the deviation when the deviation is within the predetermined range.

According to another embodiment, an apparatus comprising at least one processor, and at least one memory including computer program code, the at least one memory and the computer program code configured to, with the at least one processor, cause the apparatus to obtain measured location data of a user equipment and determine a function to forecast locations of the user equipment based on the measured location data to output forecast location data. The apparatus is also caused to receive movement data from a sensor of the user equipment, and convert the movement data to converted location data. The apparatus is further caused to compare the forecast location data with the converted location data for a deviation. The apparatus is further caused to initiate reporting of the deviation when the deviation exceeds a predetermined range, and disable the reporting of the deviation when the deviation is within the predetermined range.

According to another embodiment, a computer-readable storage medium carrying one or more sequences of one or more instructions which, when executed by one or more processors, cause an apparatus to obtain measured location data of a user equipment and determine a function to forecast locations of the user equipment based on the measured location data to output forecast location data. The apparatus is also caused to receive movement data from a sensor of the user equipment, and convert the movement data to converted location data. The apparatus is further caused to compare the forecast location data with the converted location data for a deviation. The apparatus is further caused to initiate reporting of the deviation when the deviation exceeds a predetermined range, and disable the reporting of the deviation when the deviation is within the predetermined range.

According to another embodiment, an apparatus comprises means for obtaining measured location data of a user equipment and determining a function to forecast locations of the user equipment based on the measured location data to output forecast location data. The apparatus also comprises means for receiving movement data from a sensor of the user equipment, and converting the movement data to converted location data. The apparatus further comprises means for comparing the forecast location data with the converted location data for a deviation. The apparatus further comprises means for initiating reporting of the deviation when the deviation exceeds a predetermined range, and disabling the reporting of the deviation when the deviation is within the predetermined range.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for reducing energy consumption of a user equipment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various exemplary embodiments are described with respect to a spline based forecasting mechanism, it is contemplated that the approach described herein may be used within any type of functions and curving fitting schemes.

Figure 1:
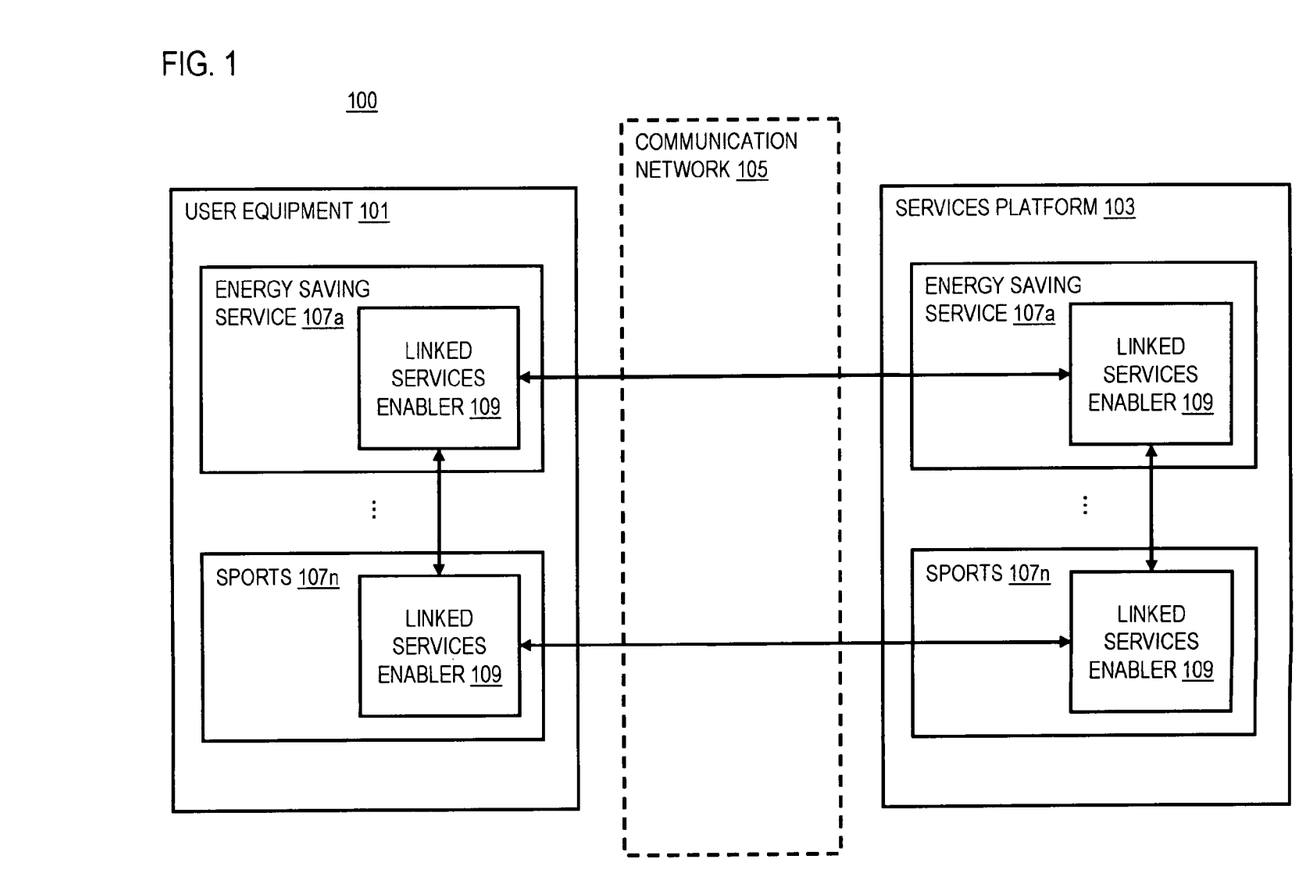
FIG. 1 is a diagram of a system capable of providing an energy-efficient location tracking service, according to one embodiment.

FIG. 1 is a diagram of a communication system capable of reducing energy consumption of a user equipment, according to an exemplary embodiment. It is recognized that modern communications devices are capable of accessing a variety of services along with any corresponding applications or content, but most users traditionally tend to use only those services with which they are familiar. As used herein, the term "services" refers to applications, functions, and/or content provided over a communication system or network. In addition, it is contemplated that the services may reside on a client, a server, or both. By seamlessly linking new services to services that are already in use, a system 100 of FIG. 1 can overcome the traditional reluctance of most users to use new services available over a communication network. More specifically, the system 100 can link services together to guide users to new services, and then motivate the users to utilize these new services by, for instance, providing rewards for completing tasks or achieving goals using the linked services. As another benefit, the linking of services advantageously reduces the number of steps for a user to discover and run new services because these services can be linked and automatically presented to the user without direct user action.

Moreover, combining multiple services together results in improved technical efficiency by not requiring each service to include redundant functions already offered by another service. It is contemplated that multiple services, such as global positioning system (GPS), sports tracking, energy saving, etc., may be linked in a way that is transparent to the user (i.e., from the user's perspective, the services appear as one coherent service). For example, a GPS service can link to a sports service for monitoring sports activity rather than have the sports activity monitoring functions built separately. In exemplary embodiments, the system 100 also provides saves energy when tracking the sports.

Although the energy saving capability is described as a service, it is contemplated that such capability can be deployed without knowledge of the user.

As shown in FIG. 1, a system 100 comprises one or more user equipment (e.g., terminal 101) having connectivity to a services platform 103 via a communication network 105. In exemplary embodiments, the terminal 101 and the services platform 103 may include one or more services 107a-107n. For example, the services 107a-107n may include an energy saving service 107a, a mapping application, a media application, a messaging application, a sports service 107n or a combination thereof. It is also contemplated that the service 107 may include any service capable of running on the terminal 101 or the services platform 103. The system 100 enables the services 107a-107n to be linked together via a linked services enabler 109. As used herein, the term "link" or "linking" refers to sharing information among multiple services to, for instance, direct users to or integrate the applications, functions, and content associated with the multiple services. In this way, two distinct services (e.g., service 107a and 107n) may be combined and function as if they were one service. In certain embodiments, the linking of multiple services is transparent to the user, and therefore, the linked services appear as one service to the user. In addition, the services 107a-107n may also be linked together in any number of ways (e.g., service 107a within terminal 101 may be linked with service 107n within the same terminal 107, or service 107a within terminal 101 may be linked with the same service 107a within the services platform 103).

For example, a user starts an energy saving service 107a. As the user advances to a particular point in the sports, the user starts a linked service 107b (e.g., a messaging application to the user's trainer). In one embodiment, a particular path in the sports does not progress until the user performs a task assigned by the trainer. On resuming the service 107a, the user equipment verifies that the user has completed the task in the linked service 107b and allows the user to advance further in the sports. In this way, the user is introduced to the messaging application. It is noted that the user need not perform any other task than starting the service.

In another example, the energy saving service 107a invokes a linked service 107c for the user equipment to track locations in the linked service 107c in addition to just starting the linked service 107b. As in the example above, the user starts the energy saving service. When the user advances to a particular point in the sports, the location tracking service directs the user to send a message to the user's trainer via the linked service 107b. The energy saving service 107a verifies that the user equipment has started the energy saving process and allows the user to continue sending messages to the user's trainer (107b).

FIG. 1 depicts a linked services enabler 109 as a component within each service 107. In exemplary embodiments, the linked services enabler 109 provides the components to link multiple services together. However, in certain embodiments, the linked services enabler 109 may be a standalone component that is separate from each service 107. Under this scenario, the terminal 101 and the services platform 103 include, for instance, a single linked services enabler 109 that interfaces with each service 107 resident on either the terminal 101 or the services platform 103 to support linked services.

In exemplary embodiments, the UE 101 is any type of mobile terminal, fixed terminal, or portable terminal including mobile handsets, stations, units, devices, multimedia tablets, Internet nodes, communicators, desktop computers, laptop computers, Personal Digital Assistants (PDAs), or any combination thereof. It is also contemplated that the terminal 101 can support any type of interface to the user (such as "wearable" circuitry, etc.). In exemplary embodiments, the services platform 103 resides on the communication network 105 to provide services 107a-107n to the terminal 101. In one embodiment, the platform 103 can be implemented as a network server. The server can be a backend server, or configured as a distributed system, as a server farm. The terminal 101 may access the services platform 103 to browse and download available services. In addition or alternatively, the terminal 101 may obtain services 107a-107n from third party service providers (not shown). It is also contemplated that terminal 101 may obtain services 107a-107n using any other suitable mechanism such as direct transfer from physical media (e.g., flash memory) or pre-loading from the factory. In certain embodiments, the services 107a-107b may be different components with a common service platform. For example the common service platform may be a sports tracking application that allows third parties to develop different components (e.g., sports levels, musical soundtracks, video content, etc.) for use in the sports tracking application.

Additionally, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

By way of example, the terminal 101 communicates with the services platform 103 and other terminals 101 over the communication network 105 using standard protocols. The terminals 101 and the services platform 103 are network nodes with respect to the communication network 105. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Live sports tracking allows real-time tracking and sharing exercise details (e.g., locations, speeds, etc.) of one user with others. This technology is also used in orienteering competitions to show to the spectators where the competitors currently are. Since GPS has slight deviations which result in zigzag paths, one state-of-the-art Sports Tracker post processes the trace data and fits a smooth spline curve to the data. The Sports Tracker is a GPS-based activity tracker that runs on mobile devices. Information such as speed, distance, and time are automatically stored in a training diary to share a user's workouts and routes. Spline refers to a wide class of functions that are used in applications requiring data interpolation and/or smoothing. Use of splines is suitable for sports tracking applications where it is unlikely that users make very rapid deviations from the smooth path of running, cycling, etc. Spline curves are fitted to the data associated with these activities; it is noted any variety of standard, known curve fitting techniques can be employed. Spline curves are also used to extrapolate future events.

Energy-efficiency is one of the key challenges for the internet service use via mobile user equipment. As noted, battery consumption is one of the major causes of dissatisfaction of mobile phone users. Data communications and GPS functionality, in relative terms, require significant power within the mobile user equipment. To reduce the energy consumption of sports tracking or similar applications or services, the system 100 of FIG. 1 introduces the capability to reduce energy consumption of a user equipment including energy-efficient location tracking. According to certain embodiments, the system 100 applies spline extrapolation to save energy and communication needs by reducing the communication need of the "live" mode of operations, where the location of the user is shared in real time, and reducing the need to keep the GPS receiver constantly powered on. Alternatively, historical data can be employed, rather than a spline function.

Figure 2:
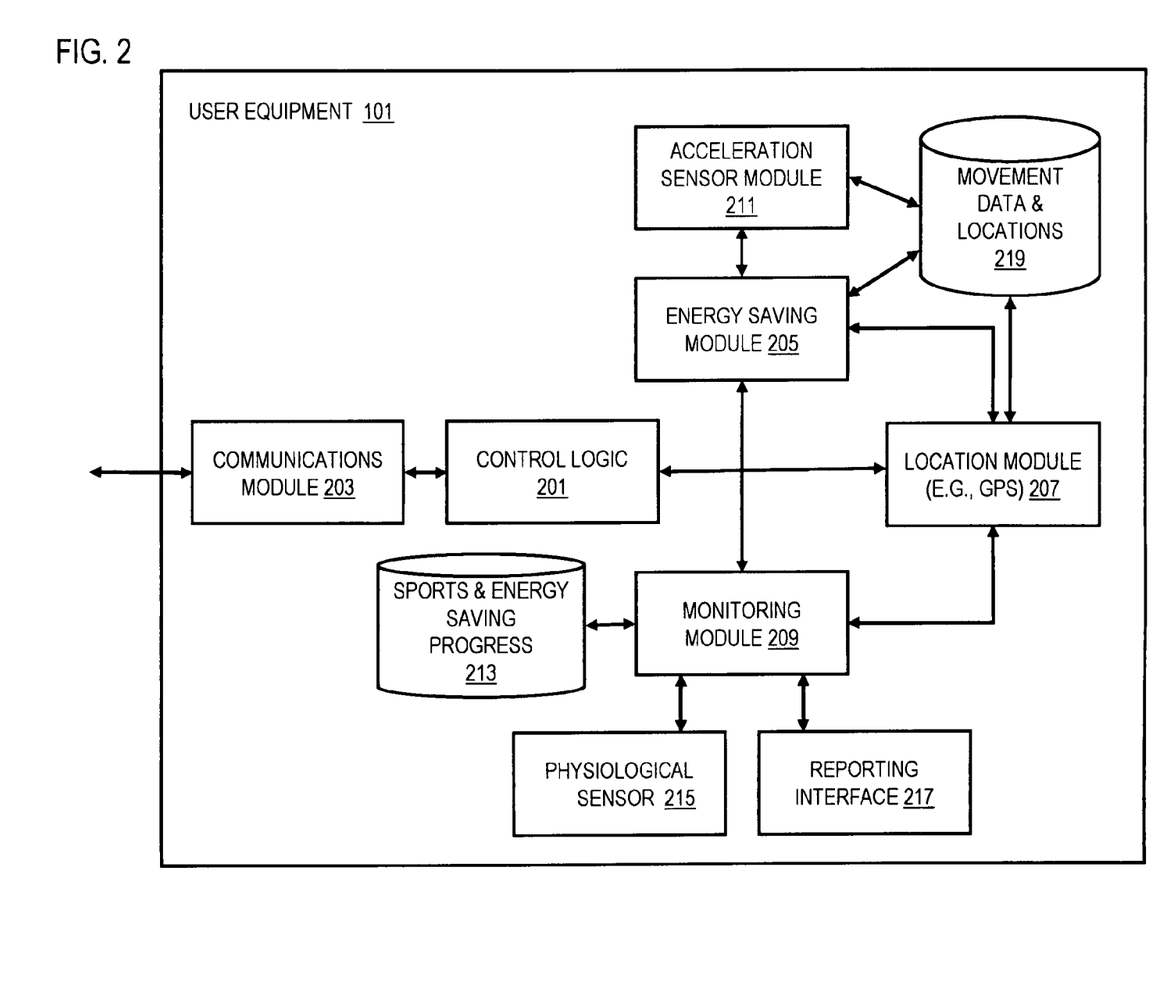
FIG. 2 is a diagram of the components of a user equipment including an energy saving module that operates in conjunction with other modules to perform the energy-efficient location tracking service, according to one embodiment.

FIG. 2 is a diagram of the components of the user equipment 101 including an energy saving module 205 that operates in conjunction with other modules to perform the energy-efficient location tracking service, according to one embodiment. By way of example, the user terminal 101 includes one or more components for linking and executing multiple services 107a-107n. It is contemplated that the functions of these components may be combined in one or more components or performed by other components of equivalent functionality. In this embodiment, the user terminal 101 includes a control logic 201 for coordinating the modules with the UE 101 to execute the multiple services 107a-107n, a communications module 203 for communicating externally (e.g., to the services platform 103, a base station, another user equipment, etc). The control logic 201 is linked with other modules, such as the energy saving module 205, a location module (e.g., GPS-based) 207 for measuring location data of the UE 101, and a monitoring module 209, for providing the services 107a-107n.

Figure 3:
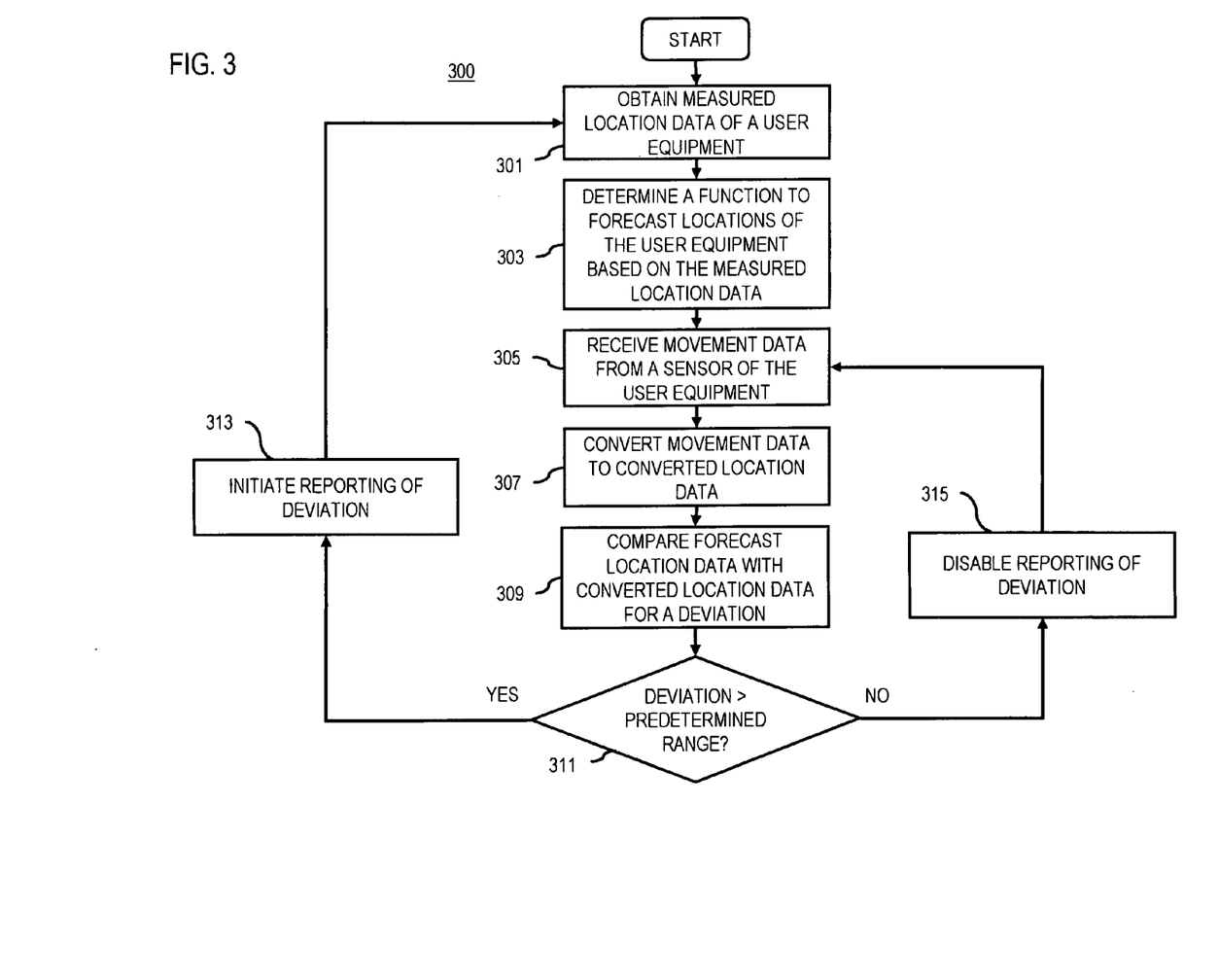
FIG. 3 is a flowchart of a process for performing the energy-efficient location tracking service, according to one embodiment.

The energy saving module 205 is connected with an acceleration sensor module 211 which consumes low energy and connects movement data of the UE 101. The energy saving module 205 converts the movement data received from the acceleration sensor module 211 into converted location data by known technologies and performs a process 300 as shown in FIG. 3. The measured location data, the movement data, and the converted location data are stored in a movement data and location database 219.

The computation of the spline curve is straightforward but consumes battery power and CPU power. Therefore, the platform 103 with greater resources (relative to the UE 101) can perform the computation. The platform 103 can send the essential parameters of the curve (or the next few locations points) to the UE 101. When the data are sent immediately after the UE 101 has sent its location to the server, there is limited extra energy consumption since there is no need to separately set up the radio connection for data transfer. In one embodiment, the UE 101 first sends the location data to the platform 103, and then other relevant data (e.g., instance heart rate). That is, while the heart rate data is being sent, the platform 103 computes the spline and sends it back to the UE 101, while there is still data connection on and traffic in the other direction.

The spline based forecasting process is not limited to disabling the reporting of the deviation, but applicable to reduce the communication of other data, such as a current location of the UE 101, the sport progress of the user, etc. In addition, the process, as further detailed below in FIG. 3, also applies to reduce the need for location data measurements. In one embodiment in which the location module 207 is a GPS receiver, the GPS function can be disabled by using low energy sensors, including but not limited to acceleration, elevation or direction, to find out how the mobile user equipment is moving with measured acceleration forces and other movement data. If converted location data (from the movement data) match the forecasted spline then there is no need to keep the GPS receiver on (which consumes a relatively large amount of power). Only when a deviation from the forecast occurs, the GPS receiver is activated for new measurements to find the accurate location again. Disabling GPS receiver reduces the energy consumption of the mobile user equipment. In another embodiment, the GPS receiver is power on periodically for calibration.

If there is further map information available, such as altitude or road/path data, the process 300 uses the information to adjust the forecast location data. For instance, the speed is likely to reduce in an uphill or the user is likely to follow existing roads and paths. With this approach, the process 300 increases accuracy of the forecast location data and thus reduces communication needs and/or keeps the GPS receiver powered down.

The monitoring module 209 monitors sports and energy saving progresses and stares the data into a sports and energy saving progress database 213. The monitoring module 209 monitors the user's progress towards completing the running assignment and reports on how far the user has run to the user and the sports tracking service. On completing the 5 km run, the monitoring module 209 informs the control logic 201.

The monitoring module 209 also receives data from a physiological sensor 215 for measuring a variety of physiological characteristics such as blood metabolite and oxygen saturation in body tissues, etc. To assist with the monitoring of sports, the monitoring module 209 interacts with the physiological sensor 215. The physiological sensor 215, for instance, provides connectivity of a variety of physical measurement accessories or sensors to monitor activities in services 107a-107n (e.g., a sports service) that involve real work activities or measurements. By way of example, the measurement accessories and sensors measure parameters including acceleration, movement, location, elevation, hear rate, orienteering support tags, galvanic skin response, conductivity, body fat, body mass, body mass index, or a combination thereof. Table 1 below describes these parameters. It is contemplated that the monitoring module 209 may interface with any other physical measurement accessory or sensor supported by a linked service 107.

TABLE 1

| Measurement Parameter | Use |
| --- | --- |
| Acceleration | Used for step counting, activity intensity level, dead reckoning in location, etc. |
| Movement | Gyroscopes and other inertial sensors may be used to determine the same information as described for acceleration. |
| Location | Used for tracking the distance, speed, route, elevation, etc. of physical or sports activities. |
| Altimeter | Used to track the elevation for sports performance (e.g., climbing or running stairs). |
| Heart Rate | Used to track the heart rate during physical activity and overall fitness level. |
| Orienteering support tags | Used instead of location to verify that a user has visited a specific location using, for instance, near field communication (NFC) tags, radio-frequency identification (RFID) tags, barcodes, visual tags, and other like technologies. |
| Galvanic Skin Response | Used for measuring sweat and other skin-related responses as a measure of physical activity. |
| Body Fat | Used to measure body fat percentage and composition. |
| Body Mass | Used to measure body weight. |
| Body Mass Index | Used to measure body fat percentage and composition. |

The monitoring module 209 also receives energy saving status form the control logic 201. The monitoring module 209 also interacts with a reporting interface 217 to receive progress data directly from other linked services 107a-107n or from the user or other parties through manual input. For example, the reporting interface 217 may receive reports from the energy saving service 107a on how much exercise the user has completed, or reports form the control logic 201 about energy saving progress. It is contemplated that the reporting interface 217 may receive reports from any linked services 107a-107n capable of sending the reports.

By way of example, the reporting interface 217 cannot receive automated progress reports from the linked services 107a-107n because the service report does not report such reporting (e.g., the application supporting a linked service does not have automated reporting capabilities) or the task or activity is not amenable to automated reporting (e.g., a physical activity for which there currently is no practical or readily available sensor such as swimming). In this case, the reporting interface 217 enables the user to manually enter the user's progress with respect to a particular activity. In addition or alternatively, the reporting interface 217 can receive manual progress reports from an authenticated third party (e.g., a coach or sporting official). For example, the authenticated third party is an observer of the user's sports activity who can file official progress reports. It is contemplated that the reporting interface 217 may use any authentication mechanism to verify that the third party is suitable for filing reports of the user's progress. For example, it can be difficult or unpractical to construct automated sensors to verify that a user is playing a soccer match. In this case, the user's soccer coach can enter and verify information with respect to the user's participation in a soccer match.

Figure 8:
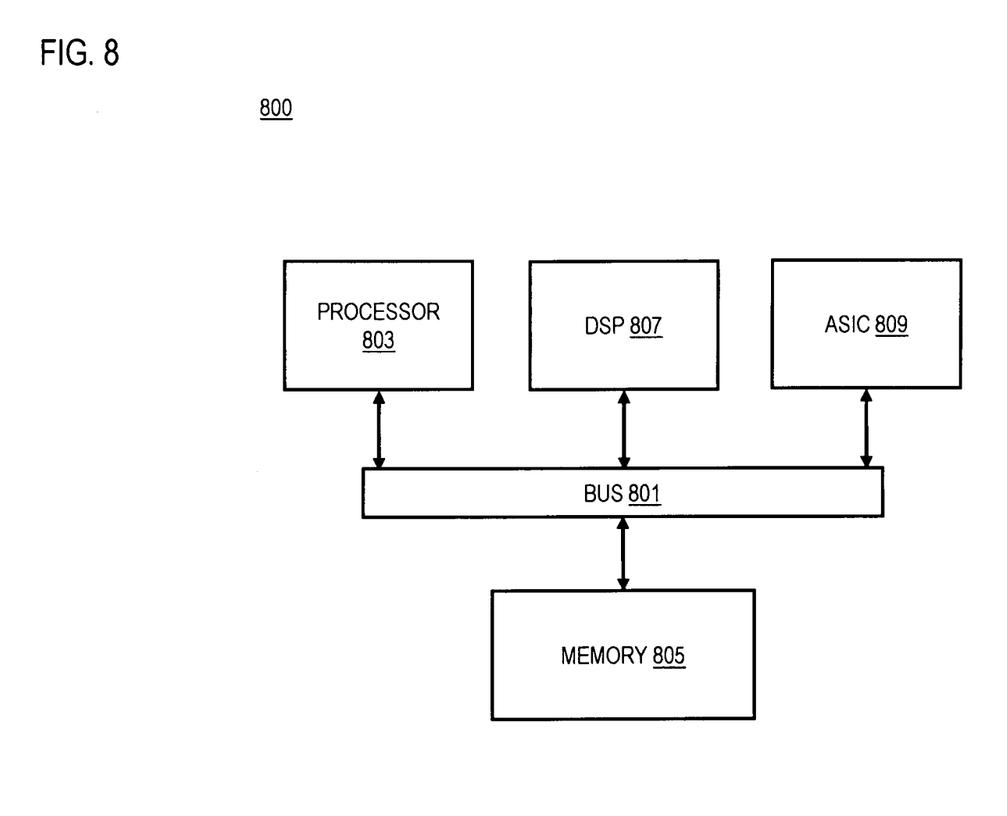
FIG. 8 is a diagram of a chip set that can be used to implement an embodiment of the invention.

FIG. 3 is a flowchart of a process for performing the energy-efficient location tracking service, according to one embodiment. In one embodiment, the energy saving module 205 performs the process 300 and is implemented in, for instance, a chip set including a processor and a memory as shown in FIG. 8. In step 301, the energy saving module 205 obtains, from the GPS module 207 or the database 219, measured location data of the UE 101. The energy saving module 205 then use the control logic to determine a function (e.g., a spline) or utilize historical data to forecast locations of the UE 101 based on the measured location data to output forecast location data (Step 303). The energy saving module 205 receives movement data from the acceleration sensor module 211 or the database 219 (Step 305), and converts the movement data to converted location data (Step 307). In step 309, the energy saving module 205 compares the forecast location data with the converted location data for a deviation. Based on the result of the comparison, the energy saving module 205 either initiates reporting of the deviation (Step 313), when the deviation exceeds a predetermined range (Step 311), or disables the reporting of the deviation (Step 315) when the deviation is within the predetermined range (Step 311). After reporting the deviation, the energy saving module 205 repeat the process 300.

Alternatively, the energy saving module 205 can return to Step 305 to obtain new movement data and perform a short cycle of the process 300, so as to save energy by skipping the reporting step 313, the measured data obtaining step 301, and the forecasting step 303.

Figure 4:
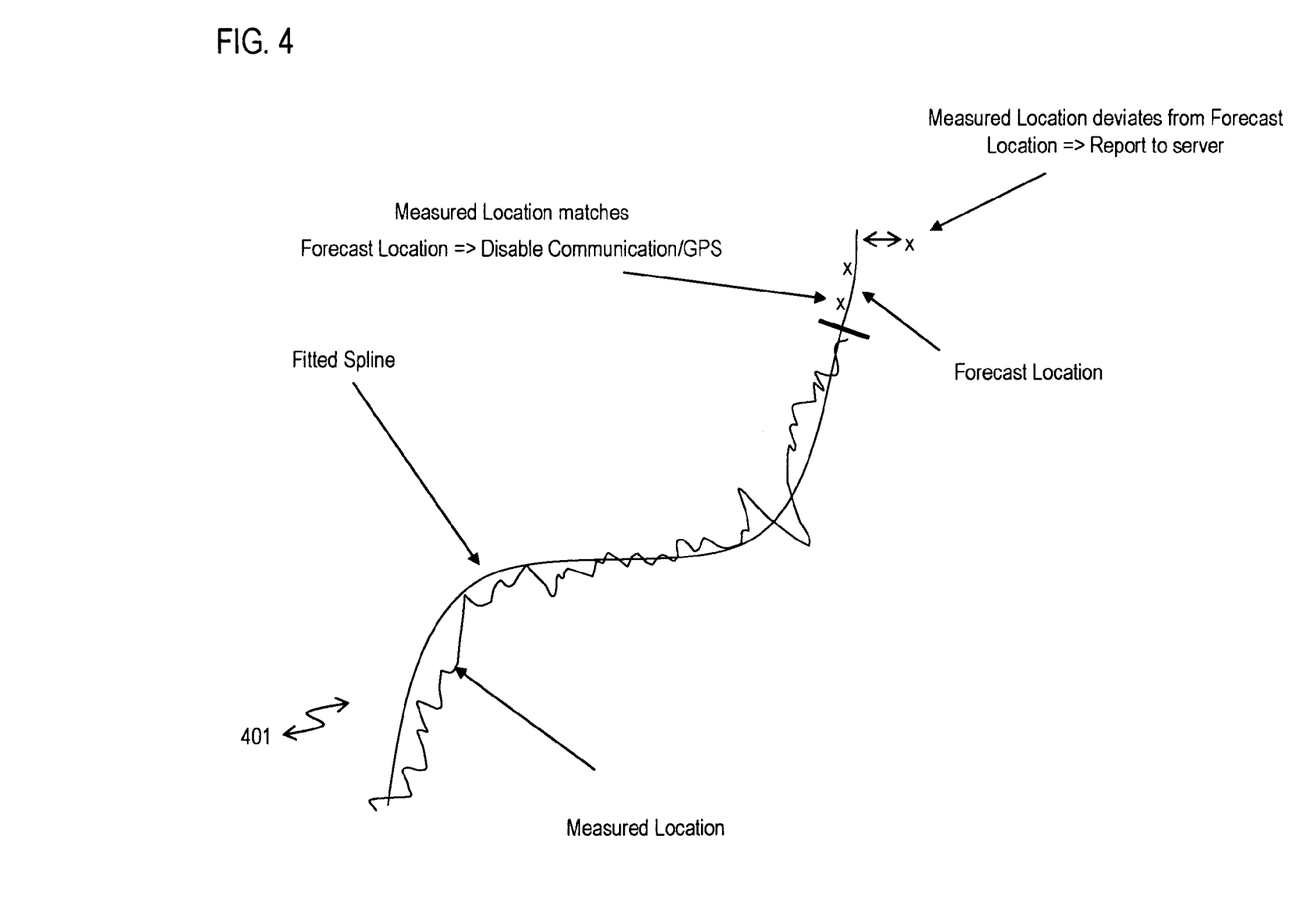
FIG. 4 is diagram of a spline curve utilized in the process of FIG. 3, according to one embodiment.

During the energy saving process 300, either the UE 101 or the platform 103 (which can behave as a back end server) computes a spline curve of FIG. 4 that fits the measured GPS locations. Splines match sports tracing energy saving application. Other forecasting methods could be applied. As mentioned, the process 300 is implemented as a middleware component used by multiple applications.

FIG. 4 is diagram of a spline curve utilized in the process of FIG. 3, according to one embodiment. A spline curve 401 can be three dimensional, comprising x- and y-coordinates and the speed. If the UE 101 moves following the estimated curve, there is no need to report the present location. Only when the movement deviates from the curve is there a need to communicate the information. This advantageously reduces communication over the network, which results into reduced energy consumption, less communication cost (e.g., in case of traffic based tariffs), and saves the radio resources of the mobile service provider.

Figure 5:
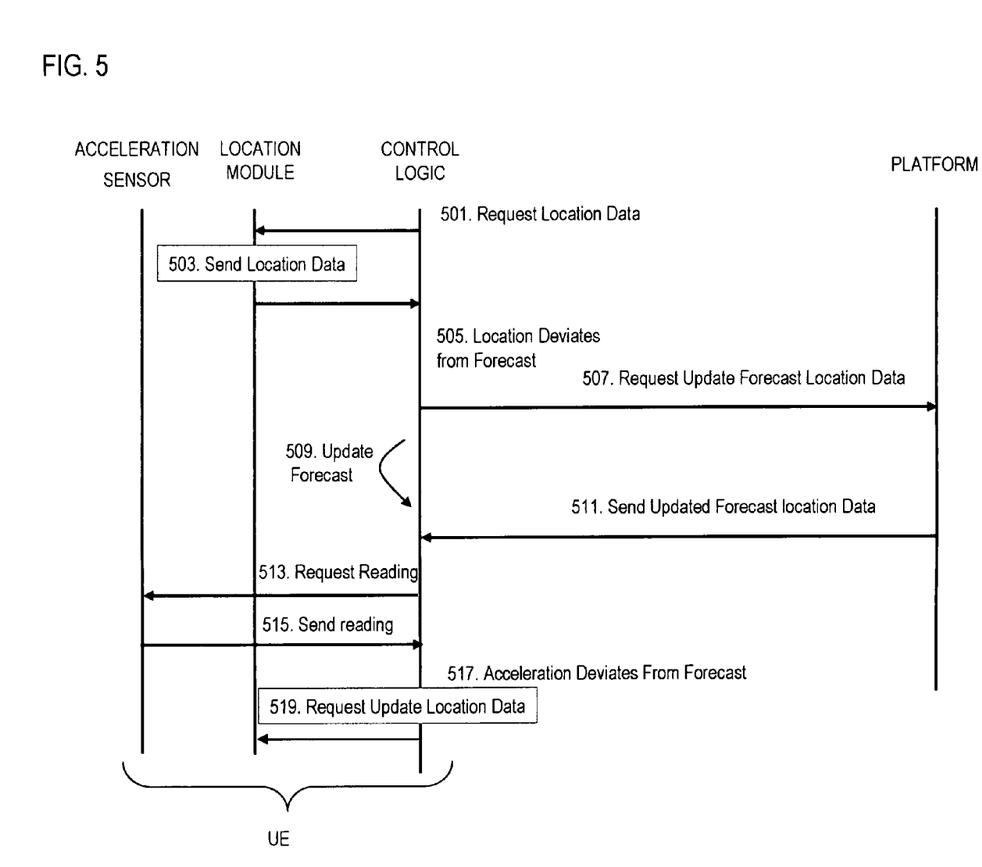
FIG. 5 is communication diagram of components utilizing the process of FIG. 3, according to one embodiment.

FIG. 5 is communication diagram of components utilizing the process of FIG. 3 in conjunction with preceding steps, according to one embodiment. By way of example, the UE 101 first requests measured location data from the GPS, and the GPS send the measure location data to the UE 101 (Steps 501 and 503). It is noted that the sequence of applying the sensor reading, the positional information or location data (e.g., GPS) reading, and the forecast location data can be modified. When there is a deviation between the GPS location data and the prior forecast location data (as determined in Step 505), the UE 101 either compute the forecast location data itself, or requests the platform 103 to do the computation (per Steps 507 and 509). The platform 103 sends the UE 101 the computed forecast location data, as in Step 511). The UE 101 then requests, via control logic 201, movement data reading from the acceleration sensor 211 (Step 513). The acceleration sensor 211 then sends back the reading, per Step 515. The control logic 201 then determines whether there is a deviation between the converted location data (from the sensor reading) and the forecast location data (Step 517). In step 519, when there is a deviation between the converted location data and the forecast location data, the control logic 201 requests update location data from the location module 207 again, thus start the whole sequence again. In one embodiment, the location module 207 and the acceleration sensor 211 are physically separated devices from the UE 101. In other embodiments, they can be bundled into two devices or one device.

Figure 6A:
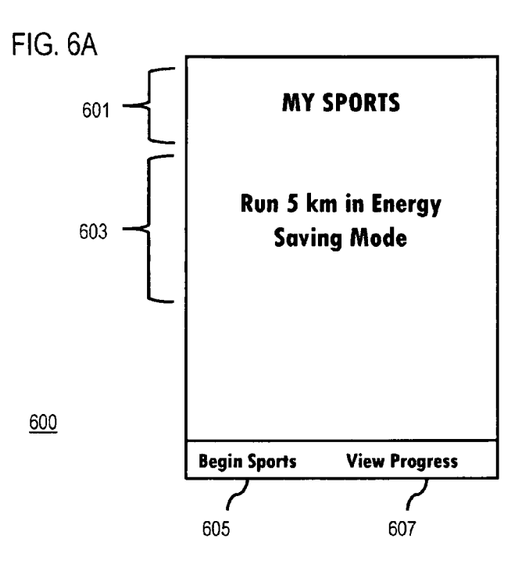
FIGS. 6A-6B are diagrams of user interfaces utilized in the process 300 of FIG. 3, according to various embodiments.
Figure 6B:
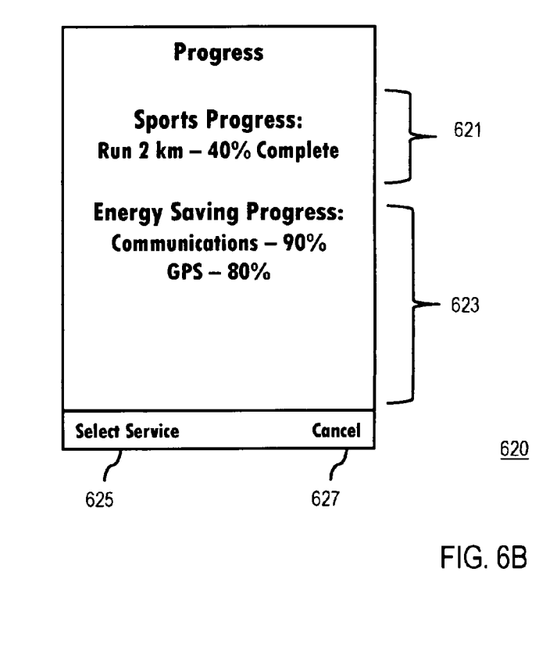

FIGS. 6A-6B are diagrams of user interfaces utilized in the process 300 of FIG. 3, according to various embodiments. By way of example, the reporting interface 217 displays the progress data on the screen 620 (FIG. 6B), after the user activates the "My Sports" feature 601 shown in the top section 601 of the screen 600 (FIG. 6A) by setting the sports as "Run 5 km in Energy Saving Mode" in the middle section 603 of the screen 600, and clicking a "Begin Sports" icon 605. After the exercise, the user clicks a "View Progress" icon 607, and the Screen 620 displays "Sports Progress: Run 2 km—40% Complete" in the top section 621 and "Energy Saving Progress: Communication—90% GPS—80%" in the middle section 623 of the Screen 620. The user can click "Select Service" icon 625 to choose other services, or click "Cancel" income 627 to cancel the selected services. Table 2 shows the actual power saved by applying the process 300 to an exemplary sport activity with an exemplary mobile phone (in practice there can be a large variation, depending on the devices and sports activities).

TABLE 2

| | Power (W) | Sports Tracking Live mode | | Communications Saving Mode | | Communications/GPS Saving | |
|---|---|---|---|---|---|---|---|
| | | Utilization (%) | Average power (W) | Utilization (%) | Average power (W) | Utilization (%) | Average power (W) |
| GPS | 0.25 | 100% | 0.25 | 100% | 0.25 | 20% | 0.05 |
| Communication (3G cellular) | 0.90 | 100% | 0.90 | 10% | 0.09 | 10% | 0.09 |
| CPU and other components | 0.20 | 100% | 0.20 | 100% | 0.20 | 100% | 0.20 |
| Total | | | 1.35 | | 0.54 | | 0.34 |

The process 300 can use the same spline calculation in tracking friends/family, car, fleet, etc. Friends or family tracking is a localization and micro-blogging service that allows users to exchange messages to friends and family members to communicate their locations. The position is determined by the location module 207 (e.g., GPS receiver) integrated in the UE 101. If the UE 101 has no GPS receiver, a software is stored therein to estimate its location based on the whereabouts determined by the communications network 105.

The energy saving processes can be seen by monitoring the network traffic between the mobile user equipment 101 and the platform 103. Depending on the implementation, some of this functionality could also be visible in the user interface which displays the spline curves. In one embodiment, the energy saving results are displayed on the user equipment along with the progress of the sports as shown in FIG. 6B, as a means of encouraging use of the energy saving mechanism.

The processes described herein for providing energy-efficient location tracking may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
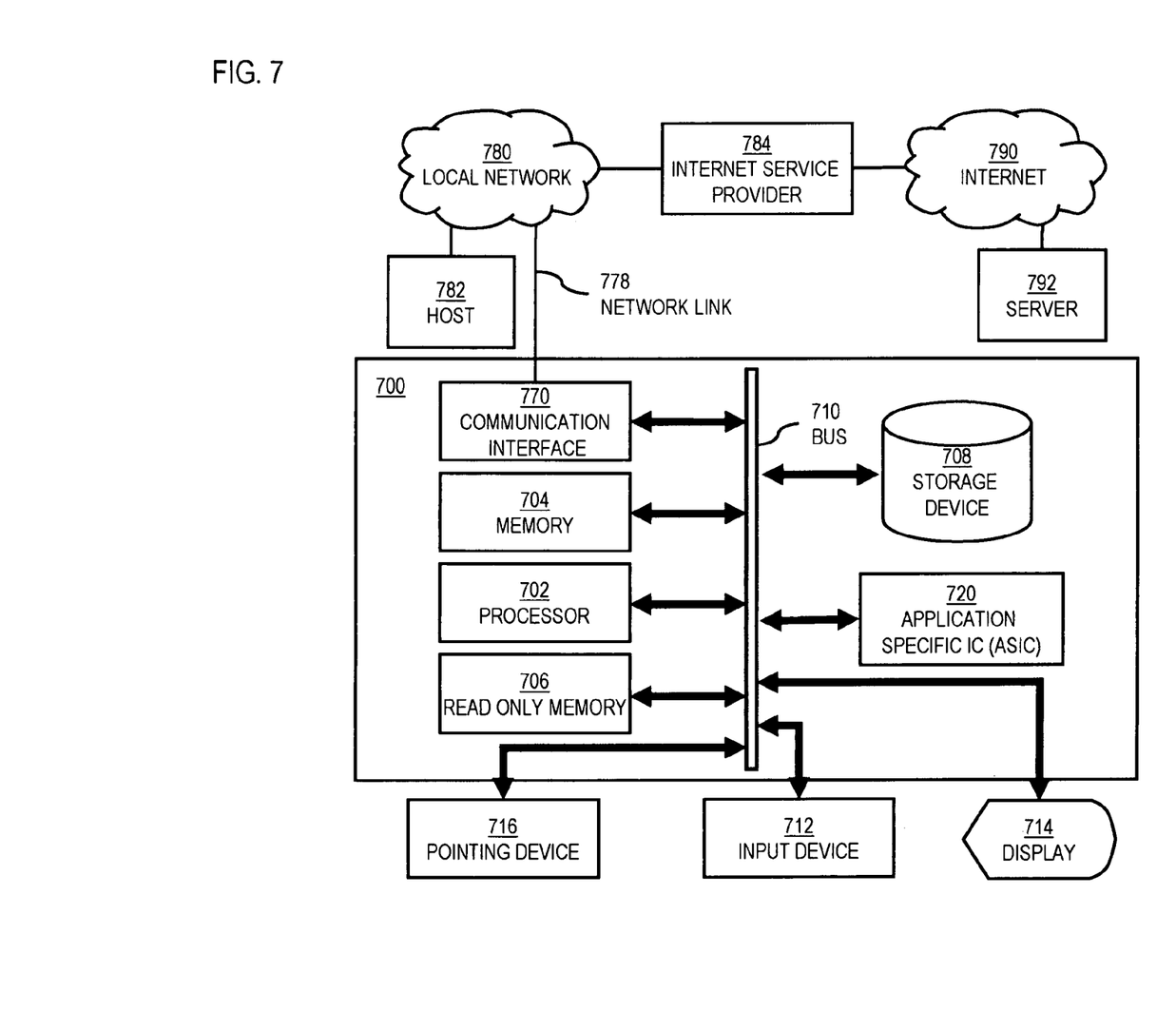
FIG. 7 is a diagram of hardware that can be used to implement an embodiment of the invention.

FIG. 7 illustrates a computer system 700 upon which an embodiment of the invention may be implemented. Computer system 700 is programmed to energy-efficient location tracking as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information related to energy-efficient location tracking. The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for energy-efficient location tracking. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for energy-efficient location tracking, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for energy-efficient location tracking of the UE 101.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to energy-efficient location tracking as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to energy-efficient location tracking. The memory 805 also stores the data associated with or generated by the execution of the inventive steps.

Figure 9:
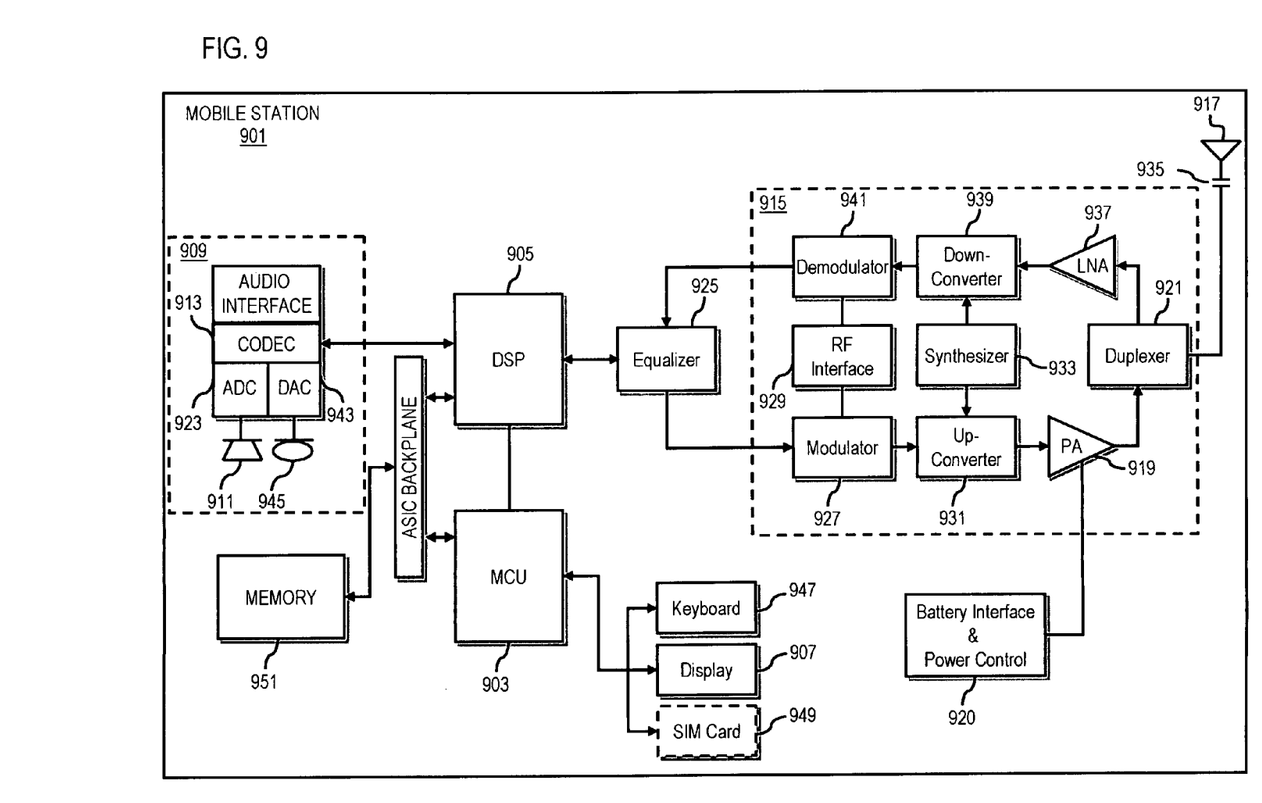
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to energy-efficient location tracking. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for conserving energy in a user equipment comprising:
    obtaining measured location data of the user equipment;
    determining a function to forecast locations of the user equipment based on the measured location data to output forecast location data;
    receiving movement data from a sensor of the user equipment;
    converting the movement data to converted location data;
    comparing the forecast location data with the converted location data to determine a deviation there between;
    initiating reporting of the deviation from the user equipment to a service platform over a radio network, when the deviation exceeds a predetermined range; and
    disabling the reporting of the deviation to the service platform, when the deviation is within the predetermined range.

2. A method of claim 1, further comprising:
    causing, at least in part, updating the forecast location data based upon the reported deviation while excluding the deviation within the predetermined range,
    wherein the function is a spline or a historical route.

3. A method of claim 2, further comprising:
    receiving subsequent movement data from the sensor of the user equipment;
    converting the subsequent movement data to converted subsequent location data;
    comparing the updated forecast location data with the converted subsequent location data for a subsequent deviation,
    wherein the spline is interpolated by the user equipment or the service platform configured to communicate with the user equipment over the radio network.

4. A method of claim 3, further comprising:
    initiating reporting of the subsequent deviation to the platform, when the subsequent deviation exceeds the predetermined range;
    disabling the reporting of the subsequent deviation, when the subsequent deviation is within the predetermined range; and
    causing, at least in part, updating the updated forecast location data based upon the reported subsequent deviation.

5. A method of claim 2, further comprising:
    causing, at least in part, display of live sports progress of a user carrying the user equipment based upon the updated forecast location data,
    wherein the user equipment is a mobile user device.

6. A method of claim 5, wherein the live sports progress is displayed at the service platform, one or more other user equipment, or a combination thereof.

7. A method of claim 1, wherein the measured location data are measured with a global positioning system (GPS) receiver, and the sensor is an acceleration sensor.

8. A method of claim 7, further comprising:
    disabling reporting of the measured location data by disabling the GPS receiver after the forecast location data is outputted.

9. A method of claim 1, wherein altitude or road/path data is used to adjust the forecast location data, and an elevation sensor and a compass are used to determine altitude and direction changes.

10. An apparatus for conserving energy in a user equipment comprising:
    at least one processor; and
    at least one memory including computer program code,
    wherein the at least one memory and the computer program code configured to, with the at least one processor, cause the apparatus to perform at least the following:
    obtain measured location data of the user equipment, determine a function to forecast locations of the user equipment based on the measured location data to output forecast location data, receive movement data from a sensor of the user equipment, convert the movement data to converted location data, compare the forecast location data with the converted location data to determine a deviation there between;

initiate reporting of the deviation from the user equipment to a service platform over a radio network when the deviation exceeds a predetermined range, and disable the reporting of the deviation to the service platform, when the deviation is within the predetermined range.

11. An apparatus of claim 10, wherein the function is a spline or a historical route.

12. An apparatus of claim 11, wherein the spline is interpolated by the user equipment or the service platform configured to communicate with the user equipment over the radio network.

13. An apparatus of claim 10, wherein the measured location data are measured with a global positioning system (GPS) receiver, and the sensor is an energy conserving acceleration sensor.

14. An apparatus of claim 13, wherein the apparatus is further caused to disable the GPS receiver.

15. An apparatus of claim 10, wherein altitude or road/path data is used to adjust the forecast location data, and an elevation sensor and a compass are used to determine altitude and direction changes.

16. A non-transitory computer-readable storage medium for conserving energy in a user equipment, carrying one or more sequences of one or more instructions which, when executed by one or more processors, cause an apparatus to perform at least the following:

obtaining measured location data of a the user equipment;

determining a function to forecast locations of the user equipment based on the measured location data to output forecast location data;

receiving movement data from a sensor of the user equipment;

converting the movement data to converted location data;

comparing the forecast location data with the converted location data to determine a deviation there between;

initiating reporting of the deviation from the user equipment to a service platform over a radio network when the deviation exceeds a predetermined range; and disabling the reporting of the deviation to the platform, when the deviation is within the predetermined range.

17. A computer-readable storage medium of claim 16, wherein the function is a spline or a historical route.

18. A computer-readable storage medium of claim 17, wherein the spline is interpolated by the user equipment or the service platform configured to communicate with the user equipment over the radio network.

19. A computer-readable storage medium of claim 16, wherein the measured location data are measured with a global positioning system (GPS) receiver, and the sensor is an acceleration sensor.

20. A computer-readable storage medium of claim 19, wherein the apparatus is caused to further perform:

disable the GPS receiver.

* * * * *